United States Patent
Dierbeck

(10) Patent No.: US 6,619,772 B2
(45) Date of Patent: Sep. 16, 2003

(54) BALL BEARING SLIDE ASSEMBLY

(75) Inventor: Bruce E. Dierbeck, Dousman, WI (US)

(73) Assignee: Oconomowoc Manufacturing Corporation, Oconomowoc, WI (US)

( * ) Notice: Subject to any disclaimer, the term of this patent is extended or adjusted under 35 U.S.C. 154(b) by 0 days.

(21) Appl. No.: 09/834,484

(22) Filed: Apr. 13, 2001

(65) Prior Publication Data

US 2001/0035704 A1 Nov. 1, 2001

Related U.S. Application Data

(60) Provisional application No. 60/197,122, filed on Apr. 14, 2000.

(51) Int. Cl.⁷ ............................................... A47B 88/04
(52) U.S. Cl. ............................... 312/334.13; 312/334.1; 312/334.12
(58) Field of Search ................... 312/330.1, 334.1, 312/334.7, 334.8, 334.9, 334.11, 334.12, 334.13, 334.16, 334.17, 334.18; 384/18, 19, 20

(56) References Cited

U.S. PATENT DOCUMENTS

| | | | | |
|---|---|---|---|---|
| 3,874,748 A | * | 4/1975 | Figueroa | 384/19 |
| 4,145,093 A | * | 3/1979 | Sekerich | 384/19 |
| 4,181,383 A | * | 1/1980 | Naef | 312/334.13 X |
| 4,295,688 A | * | 10/1981 | Blasnik | 384/19 |
| 5,520,452 A | * | 5/1996 | Petersen et al. | 312/334.12 |
| 5,733,026 A | * | 3/1998 | Munachen | 312/334.12 |
| 5,924,800 A | | 7/1999 | Obara et al. | 384/532 |
| 6,033,047 A | | 3/2000 | Hoffman | 312/334.44 |
| 6,132,020 A | | 10/2000 | Schael et al. | 312/334.1 |

\* cited by examiner

*Primary Examiner*—James O. Hansen
(74) *Attorney, Agent, or Firm*—Whyte Hirschboeck Dudek SC

(57) ABSTRACT

A ball bearing roller and ball bearing slide assembly for use in an article of manufacture, for example a toolbox having drawers, is disclosed. The ball bearing slide assembly can comprise a first slide element, a second slide element and a carriage, wherein the carriage couples, in combination with a ball bearing roller, the first slide member to the second slide member such that the second slide member moves relative to both the first slide member and the carriage. The ball bearing roller is swaged on a side of the roller that is attachable to the article of manufacture. The ball bearing slide assembly can be used, for example, as a drawer slide assembly. The ball bearing slide assembly enhances lateral stability. The likelihood of bearing fatigue, and ultimate bearing failure, due to lateral movement is decreased. A cost effective way to align, for example, shelves or drawers, with respect to the article of manufacture is provided. The solution provides a way to accomplish these benefits while maintaining a minimal pull force during, for example, an open-close cycle of a drawer, regardless of whether a pull cycle is centered or off-center.

10 Claims, 6 Drawing Sheets

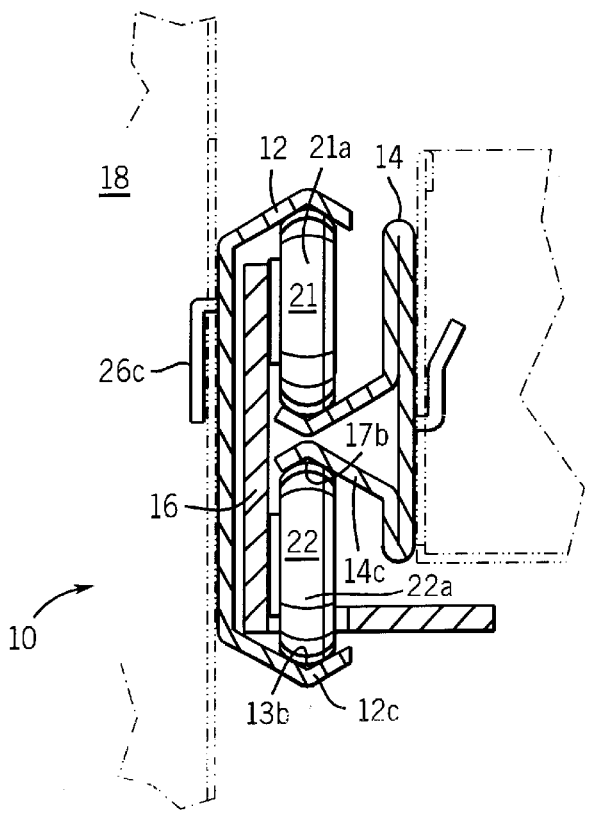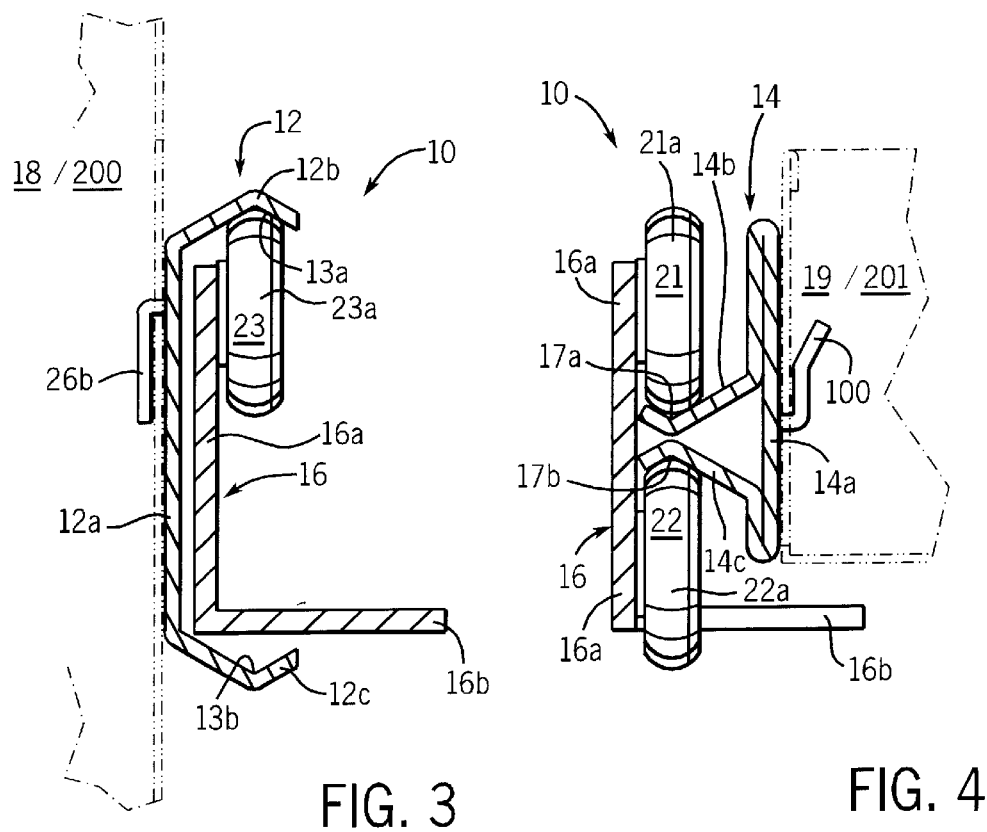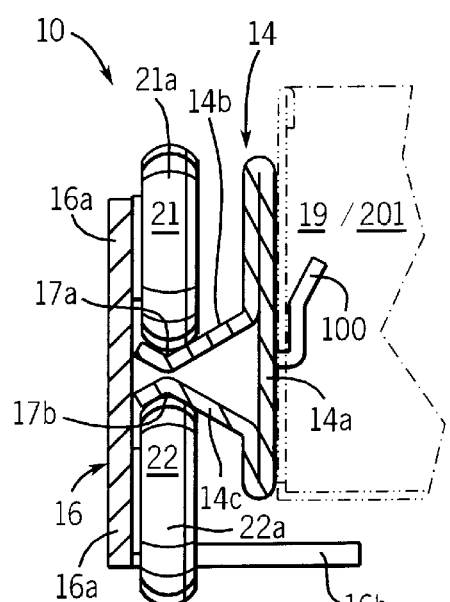
FIG. 1
FIG. 3
FIG. 4

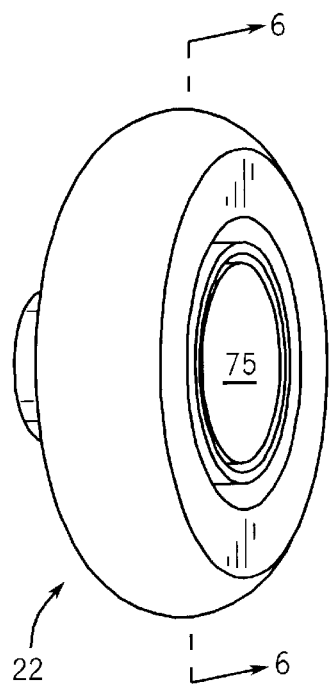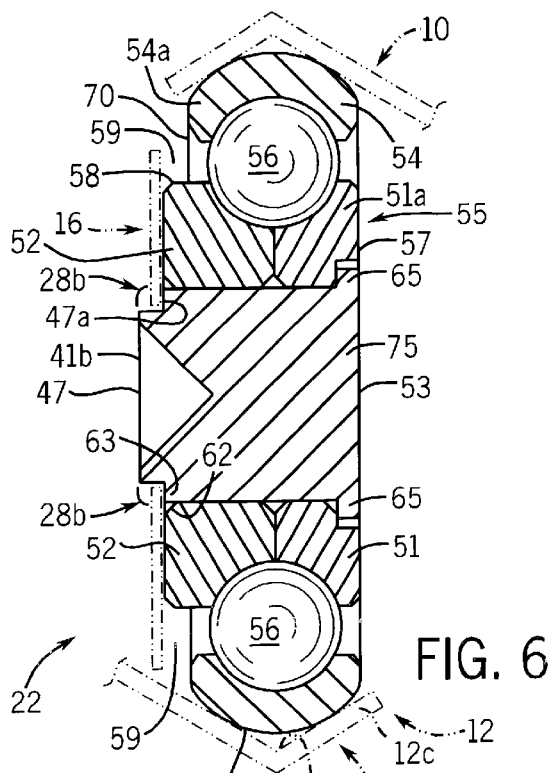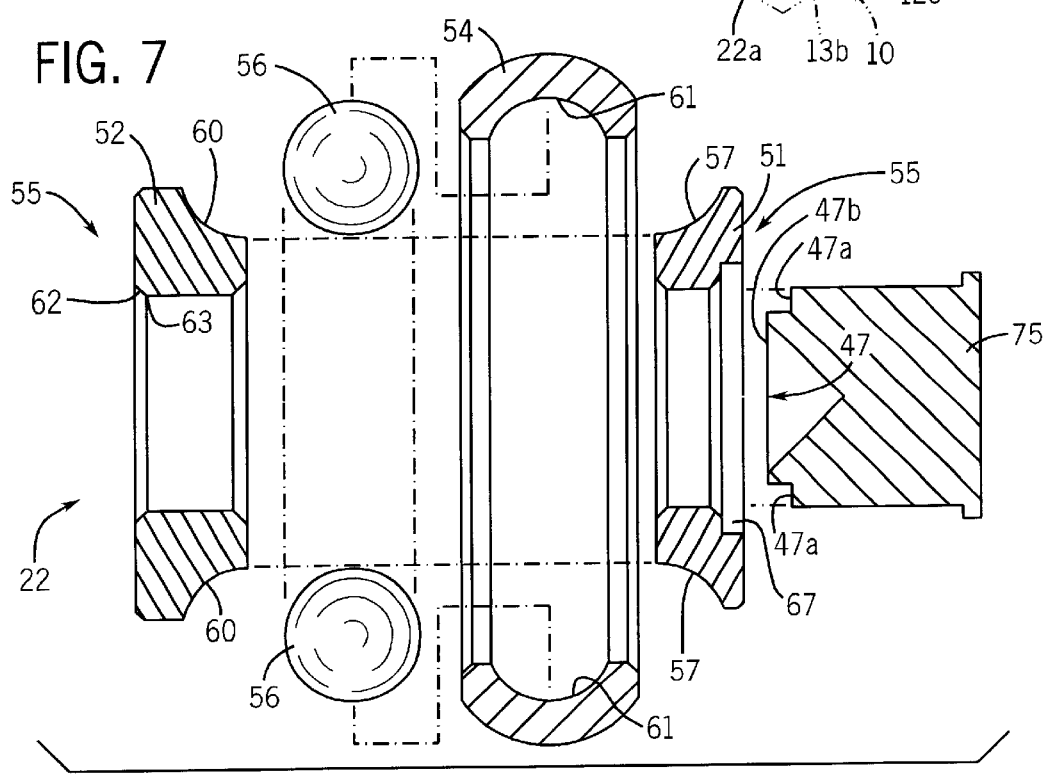

BALL BEARING SLIDE ASSEMBLY

CROSS-REFERENCE TO RELATED APPLICATION

This application claims the benefit of U.S. Provisional Application No. 60/197,122 filed Apr. 14, 2000.

FIELD AND BACKGROUND OF THE INVENTION

The present invention relates generally to a slide assembly, and more particularly, the invention relates to a ball bearing slide assembly that can be used, for example, as a drawer slide assembly.

Slide assemblies for particular use as drawer slide assemblies of various designs are known. Selection of a specific drawer slide assembly depends on the application at hand, and more particularly, on the size of the drawer and the applied loads, due to, for example, the contents that will ultimately be placed in the drawer. Content load means the total weight of the filling material contained in, for example, a drawer.

In a typical two-member drawer slide assembly, an inner slide member and an outer slide member can be used to form a single rail typically having a U-shaped cross-section. Here, each drawer slide member typically includes a runner, with the rail formed to have typically two or three raceways for receiving rolling elements (e.g., a ball bearing roller). Ball bearing rollers can be used in slide assemblies to facilitate insertion and retraction of a drawer from, or into, a box-like structure (e.g. a toolbox).

Two-part drawer slide assemblies typically permit less than full extension of the drawer, and usually about a three-quarters extension of the drawer.

Three-member drawer slide assemblies are also known, and such assemblies generally include an intermediate slide member that can form a separate component so that the drawer can be fully extended from a box or enclosure.

A common drawback of many slide assemblies heretofore has been the side-to-side movement of the drawer, compartment, platform or other content or load-bearing surface that is connected to an article of manufacture. This is particularly problematic in box-like structures, such as toolboxes, having box-like compartments or drawers. When the drawer is in a fully extended position, it can often shift laterally from side-to-side.

Many two and three-part drawer slide assemblies often provide insufficient lateral stability, especially for heavier load applications This can result in fatigue and/or failure of the slide assembly elements or parts.

Additionally, ball bearing rollers are generally connected or otherwise assembled by swaging (also called "staking") a portion of one component, for example a bearing stud, to connect the remaining components of the bearing (e.g., the inner and outer races) together. Typically, the swaged side is located on the side of the bearing roller that is not attached to another structure (e.g., a slide assembly). Swaging in this way typically results in a bearing roller that is more susceptible to the lateral shifting that can cause ball bearing rollers to fail.

Therefore, it would be desirable to provide a ball bearing slide assembly having enhanced lateral stability. It would also be desirable to provide a ball bearing roller that decreases the likelihood of bearing fatigue, and potentially, ultimate bearing failure, due to lateral movement.

SUMMARY OF THE INVENTION

The present invention provides a ball bearing roller and ball bearing slide assembly that overcomes the aforementioned problems.

According to one aspect of the present invention, a ball bearing slide assembly is disclosed, the slide assembly comprising: a first slide member; a second slide member; a carriage disposed between the first and second slide members; and a ball bearing roller, the ball bearing roller further comprising: an outer bearing race; a bearing stud to mount the ball bearing roller to the carriage, the bearing stud including a bearing hub lip and a side distal from the bearing hub lip; an inner bearing race adjacent the bearing stud, the inner bearing race including a chamfer and the portion abuts the carriage; and a bearing ball disposed in an area between the inner and outer races. The side distal from the bearing hub lip is swaged such that a swaged portion of the bearing stud is in compressive contact with the chamfer; and wherein the carriage couples, in combination with the ball bearing roller, the first slide member to the second slide member such that the second member moves relative to both the first slide member and the carriage.

In one embodiment of the ball bearing slide assembly, the inner bearing race is a split inner bearing race. In another embodiment of the ball bearing slide assembly, the split inner bearing race comprises an extended inner bearing race adjacent the bearing stud, the extended inner bearing race including a chamfer and a side adjacent the chamfer that extends beyond a first side of the outer bearing race and a flush inner bearing race adjacent to and flush with the bearing stud.

In another aspect of the present invention, a ball bearing roller is disclosed, the roller comprising: an outer bearing race; a bearing stud comprising a bearing hub lip and a side distal from the bearing hub lip; an inner bearing race adjacent the bearing stud, the inner bearing race including a chamfer; and a bearing ball disposed in an area between the inner and outer races; wherein the side distal from the bearing hub lip is swaged such that a portion of the bearing stud is in compressive contact with the chamfer.

In one embodiment, the inner bearing race is a split inner bearing race comprising an extended inner bearing race adjacent the bearing stud, the extended inner bearing race including a chamfer and a side adjacent the chamfer that extends beyond a first side of the outer bearing race and a flush inner bearing race adjacent to and flush with the bearing stud.

In another aspect, a bearing slide assembly is disclosed, the slide assembly comprising: a first slide member; a second slide member; a carriage disposed between the first and the second slide members; and a bearing attached to carriage; wherein the carriage couples, in combination with the bearing, the first slide member to the second slide member such that the second member moves relative to both the first slide member and the carriage.

In one embodiment, the bearing can be selected from one of the following: a ball bearing, a roller bearing, and a plane bearing. In another embodiment, the bearing comprises a rolling element. In yet another embodiment, the rolling element can be a bearing ball or a bearing roller.

The present invention benefits manufacturers, specifiers, and users of tool storage, transportation, file, furniture, food, medical, cabinet and related industries by providing the ball bearing roller and ball bearing slide assembly summarized above and detailed below.

In particular, with respect to tool storage boxes comprising, for example, platform-like or box-like structures, for example a toolbox having drawers, the invention provides a ball bearing roller and ball bearing slide assembly that is readily adaptable to a variety of applications, from light load applications to heavy load applications. The invention is readily applicable to both commercial and industrial applications.

The present invention provides a cost effective solution for achieving, for example, drawers that are self-aligning with respect to the toolbox to which they are mounted. The solution provides a way to accomplish the aforementioned benefits while maintaining a minimal pull force during, for example, an open-close pull/push cycle of a drawer—regardless of whether the pull/push cycle is centered or off-center.

Various other features, objects and advantages of the present invention will be made apparent from the following detailed description and the drawings.

BRIEF DESCRIPTION OF THE DRAWINGS

The various features, objects and advantages of this invention are best understood with reference to the preferred embodiments when read in conjunction with the following drawings. In addition, the drawings illustrate the best mode presently contemplated for carrying out the invention.

In the drawings:

FIG. 1 is a front elevational view of one embodiment of a ball bearing slide assembly in accordance with the present invention.

FIG. 3 is a cross-sectional view of part of the ball bearing slide assembly of FIG. 1.

FIG. 4 is a cross-sectional view of another part of the ball bearing slide assembly of FIG. 1.

FIG. 5 is a perspective view of one embodiment of a ball bearing roller in accordance with the present invention.

FIG. 6 is a cross-sectional view of the ball bearing roller taken along line 6—6 of FIG. 5.

FIG. 7 is an exploded cross-sectional view of the ball bearing roller of FIG. 6.

DETAILED DESCRIPTION OF THE PREFERRED EMBODIMENTS

In the Figures, like numerals are employed to designate like parts through the drawings.

Figure 2:
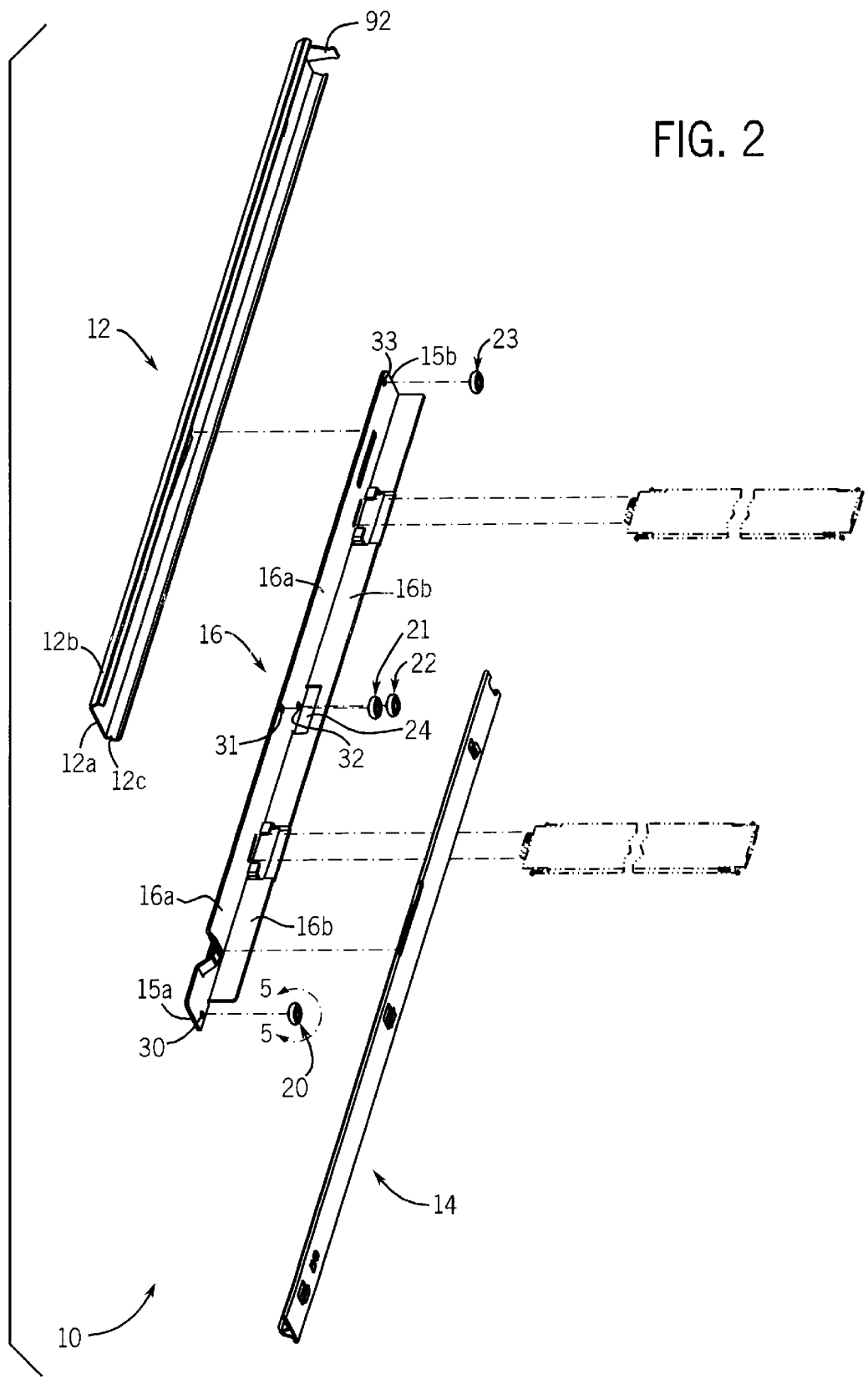
FIG. 2 is an exploded perspective view of the ball bearing slide assembly of FIG. 1.

Referring to FIGS. 1–4, a ball bearing slide assembly 10 is shown. The ball bearing slide assembly of the present invention is a device that can support, guide, and reduce friction associated with motion between fixed and moving parts. Ball bearing slide assembly 10 includes a first slide member 12, a second slide member 14 and a carriage 16. Carriage 16 comprises a plurality of substantially identical ball bearing rollers 20–23 located at various positions along, and attached to, carriage 16. In particular, carriage 16 includes substantially vertical segment 16a and substantially horizontal segment 16b connected to vertical segment 16a, to which rollers 20–23 are attached using bearing studs (not shown) via holes 30–33, respectively. First slide member 12 (also referred to as a "track") is mountable to a structure 18 (shown in phantom) via tabs 26b–c extending from the first slide member. Referring specifically to FIG. 2, ball bearing rollers 20 and 23 are located near front and rear ends 15a–b, respectively, and rollers 21 and 22 are centrally disposed along the carriage vertical segment, with roller 21 above and offset from roller 23. Opening 24 in horizontal segment 16b permits roller 22 to roll below the horizontal segment. Also, segment 16b is shortened to end at edge 25 so as to permit similar roller movement for roller 20.

Figure 8:
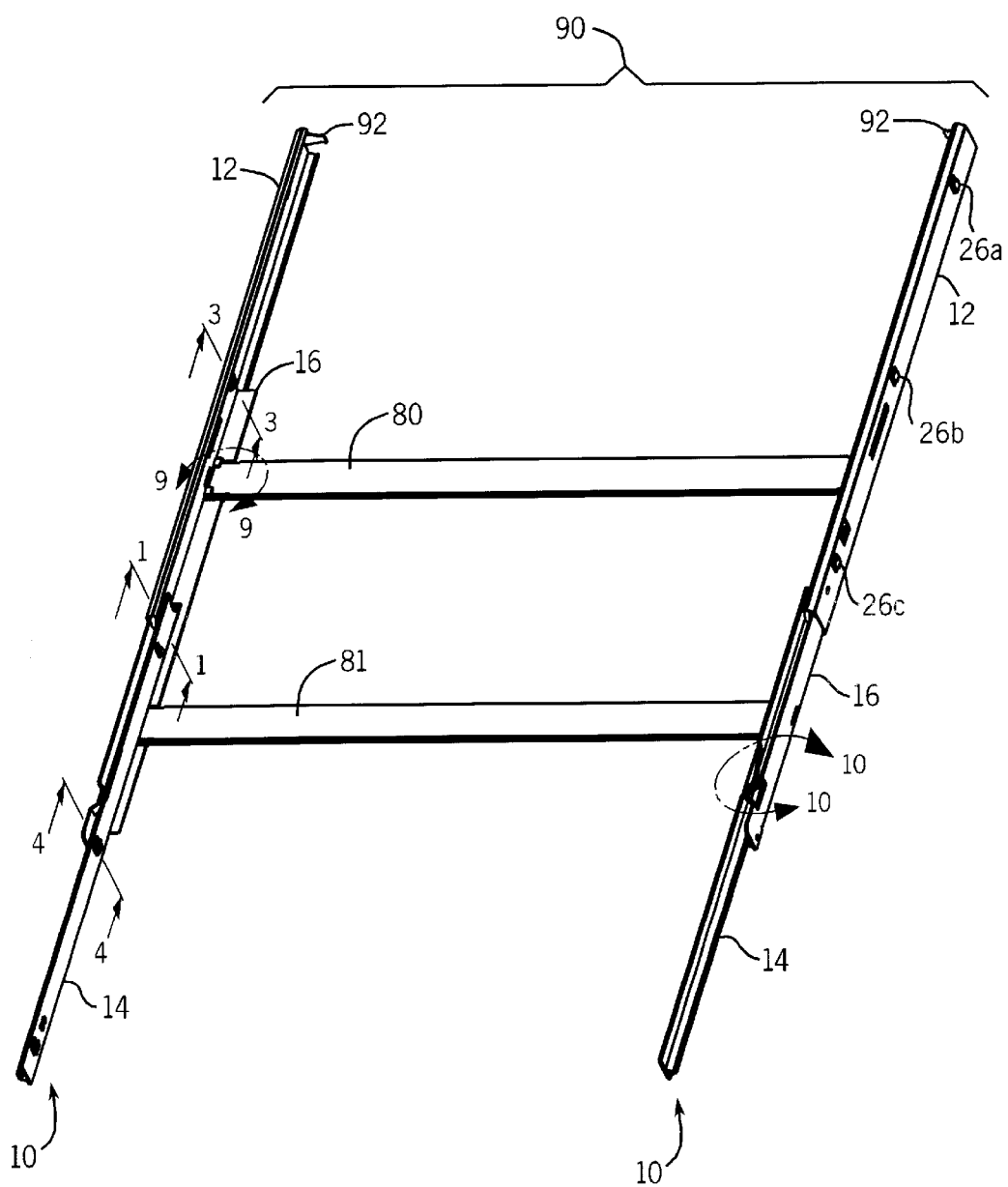
FIG. 8 is a perspective view of a ball bearing slide system incorporating the slide assembly of FIG. 1.

FIGS. 3 and 4 are cross-sectional views taken along line 3—3 and line 4—4 of FIG. 8, respectively. FIG. 8 is a perspective view of a ball bearing slide system incorporating the slide assembly of FIG. 1. Referring to FIG. 3 a cross-sectional view is shown of first slide member 12 and carriage 16 with ball bearing roller 23 attached thereto via bearing stud 33. First slide member 12 is mountable to a structure 18 (shown in phantom) via tab 26b extending from the first slide member. Structure 18 is generally representative of a variety of structures or articles of manufacture and, by way of example, can include a box structure 200 (shown in FIGS. 11–12), such as a toolbox, and the structure drawn in phantom is labeled with numerals 18 and 200 to so indicate. First slide member 12, as shown, includes a substantially vertical segment 12a. Top bent segment 12b and bottom bent segment 12c extend from and are connected to substantially vertical segment 12a, from which track tab 26 extends to connect slide member 12 to structure 18 (shown in phantom). Carriage 16 includes substantially vertical segment 16a and substantially horizontal segment 16b connected to vertical segment 16a. Attached to carriage 16 are ball bearing rollers, for example as shown, ball bearing roller 21 and 22. Specifically, rollers 21 and 22 are connected to substantially vertical segment 16a using bearing studs (not shown) via holes 31, 32 (see FIG. 8), respectively. It will be understood that the number of bearings can vary to convenience depending on the application at hand.

Still referring to FIG. 3, top and bottom bent slide member segments 12b and 12c create "V-shaped" upper and lower slide member surfaces 13a and 13b. Surface 13a provides a rolling surface for a ball bearing roller, for example, ball bearing roller 23. Similarly, surface 13b provides a rolling surface having minimized contact for a ball bearing roller (shown in phantom), for example, roller 20 or roller 21. Surfaces 13a and 13b also serve to align the ball bearing rollers and aid in distribution of any load that is carried along, in this case slide member 12 via the ball bearing rollers (e.g., a drawer and its contents in a toolbox). The V-shape of segment 12c surface 13b functions similarly. The reduced contact effectively reduces the force that is required to move the carriage within first slide member 12. Yet another benefit of the V-shape is that it can function to substantially reduce, and potentially eliminate, overall deflection in first slide member 12.

Figure 11:
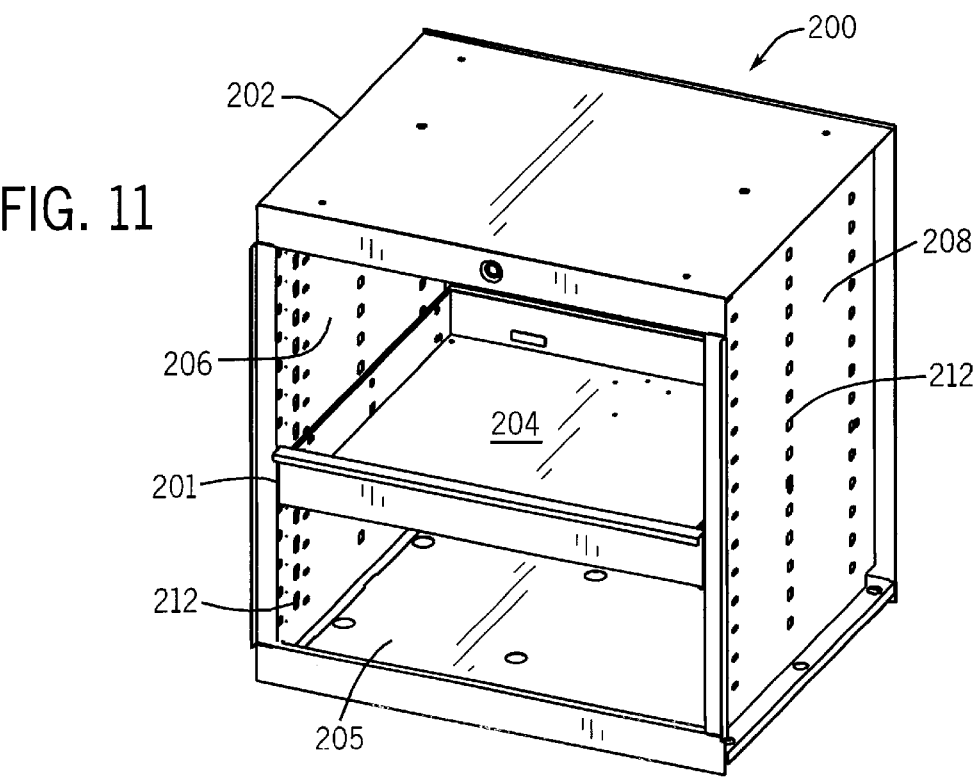
FIG. 11 is a perspective view of one article of manufacture, a toolbox, incorporating the ball bearing slide assembly of the present invention, the toolbox comprising a drawer, the drawer in a closed or retracted position.
Figure 12:
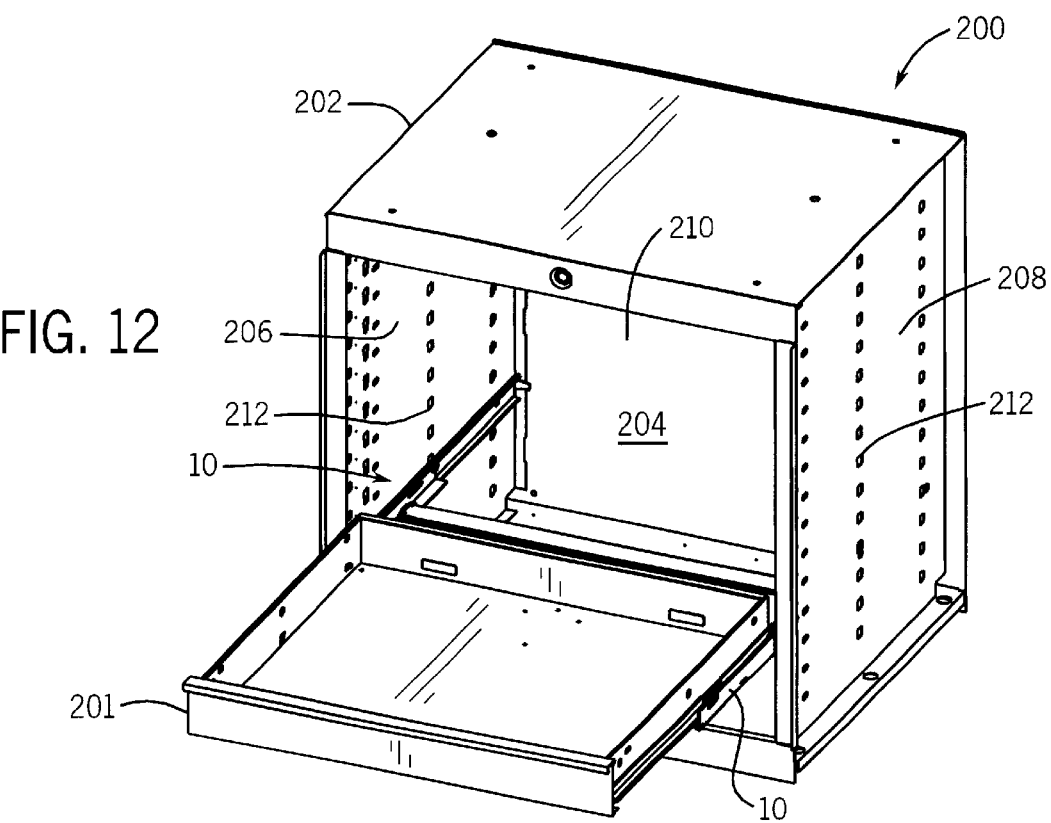
FIG. 12 is a perspective view of the toolbox shown in FIG. 11 with the drawer in an open or extended position.

Turning to FIG. 4, again a cross-sectional view taken along line 4—4 of FIG. 8, second slide member 14 is shown to comprise a vertical segment 14a. Upper and lower bent segments 14b and 14c extend from and are connected to vertical segment 14a. Segments 14b and 14c create V-shaped slide surfaces 17a and 17b, which can provide the same benefits as V-shaped surfaces 13a, b described above with respect to slide member 12 in FIG. 3. Again, carriage 16 is shown comprising horizontal segment 16b and vertical segment 16a. Ball bearing rollers 21 and 22 can now be seen, the rollers attached using bearing studs via holes 31 and 32 (FIG. 8), respectively. Second slide member 14 can be attached via mounting tab 100 to structure 19 (shown in phantom). Structure 19 is intended to represent a structure that can move with respect to article of manufacture 18. The structure can comprise, by way of example, a drawer 201 that can be inserted into a box structure 200 (both of which are shown in FIGS. 11 and 12). Thus, the structure is labeled with both numerals 19 and 201 accordingly.

In another preferred embodiment, second slide member 14 can be used as a slide assembly independently of first slide member 12 and carriage 16 for appropriate attachment to an article of manufacture. One of skill shall recognize that in this embodiment, bearing rollers, for example rollers 20–23 can be used and mounted to the article of manufacture (e.g., a box-like structure).

Referring to FIGS. 1–4, it can be seen that ball bearing slide assembly 10 comprises first slide member 12, second slide member 14 and carriage 16, and a plurality of bearing rollers 20–23 attached to the carriage via bearing studs 30–33. The carriage couples, in combination with the ball bearing rollers, the first slide member to the second slide member such that the second member moves relative to both the first slide member and the carriage. Bearing rollers 20–23 comprise curved outer surfaces 20a (not shown), 21a, 22a, and 23a. With respect to bearing 22 of FIG. 1, and as noted generally above, curved surface 22a contacts V-shaped segment 17b of slide member segment 14c to minimize frictional forces-namely, and similarly, V-shaped segment 13b of slide member segment 12c. These minimum contacts are indicated for roller 22, by way of example, with four hash marks, shown in FIG. 1.

Typically, each slide member and the carriage can be made of steel, however, other material types are contemplated, for example, plastic or aluminum. If the materials used are metal, typical manufacturing processes can comprise stamping, roll forming, die casting, cold drawing, among others. If the materials utilized include plastics, typical manufacturing processes can comprise extrusion and molding processes. Methods for manufacturing components of the inventive ball bearing slide assembly are well-known to those of skill in the art.

Referring to FIGS. 5–7, ball bearing roller 22 comprises bearing stud 75, inner bearing races 51 and 52, outer bearing race 54 and typically a plurality of ball bearings 56. A race (also called a "raceway") is a groovelike part of the bearing in which a moving part, such as a bearing ball, rolls. Bearing races 51 and 52 can also be termed "bearing race segments" making up a complete inner bearing race 55, also known as a "split inner race." It is contemplated that the present inventive bearing can comprise a single or one-piece inner race to accommodate a "caged" or "retained" ball complement.

It shall be understood that the ball bearing rollers used in the present invention, that is, rollers 20–23, are typically substantially identical. The bearing roller can comprise a variety of bearing ball types and can be selected so as to vary to the convenience of the user. Selection of an appropriate ball bearing roller is typically based on the quantity of rollers desired, as well as roller size, material, and grade. The bearing rollers described herein are typically made of steel. As shown the ball bearing rollers are designed as a "full ball complement" (or "cageless") bearing roller. Full ball complement bearings may be suitable for speeds up to 1200 rpm. It is contemplated that the ball bearing roller can also be designed as a semi-precise or caged roller and the cage itself can comprise a molded, steel, or nylon/elastomeric cage. Such semi-precise bearings typically utilize nylon ball retainer/ cages, and may be suitable for speeds up to 1800 rpm. The bearings described here are typically of the commercial unground type and they are typically customized to the particular application. However, it is contemplated that the inventive bearing can also be a precision (ground) or semi-precise bearing.

Further still, the ball bearing rollers described in this application, for example, ball bearing roller 22 (see FIG. 5) can be constructed as an independent article of manufacture without regard to a particular end use. However, additional steps can be taken to connect, mount, rivet, weld, or otherwise attach (e.g., using a threaded nut and stud, or the like) the ball bearing roller to an article of manufacture to facilitate rolling contact. By way of specific example and not limitation, described herein is a ball bearing roller that can be made for use with the ball bearing slide assembly described above, and is attached to the slide assembly carriage using a swaged bearing stud.

Referring to FIGS. 6–7, again, ball bearing roller 22 comprises bearing stud 75 and split inner bearing race 55, which again comprises inner bearing race 51 and inner bearing race 52. Again, the inventive bearing can also comprise a caged inner race (not shown). Ball bearing roller 22 also comprises outer bearing race 54. Outer bearing race 54 comprises a curved surface 22a and a substantially flat side surface 54a. Curved surface 22a can contact rolling surfaces (for example the V-shaped rolling surfaces of a ball bearing assembly shown in phantom) as described above so as to reduce frictional contact, which in turn reduces the required force to move the bearing rollers for a given load. Inner bearing race 51 includes surface 51a that is flush or substantially flush with side 53 of bearing stud 75 and outer race surface 54a. As such, it is also referred to in this application as "flush inner bearing race". Inner bearing race 52 includes side 58 that extends beyond side 70 of outer race surface 54a and so it is also referred to herein as an "extended inner bearing race".

A plurality of balls 56 that are substantially identical are placed between outer and inner races 52 and 51, respectively, in an area defined by flush inner race 57, extended inner race 60 and outer bearing race 61. Such balls are typically made of steel. Extended inner bearing race 52 includes a surface 58 that extends beyond side 54a of outer bearing race 54 so as to provide a clearance space 59. Space 59 can function to prevent contact between ball bearing roller components (e.g., outer bearing race, inner bearing race, etc.) and the ball bearing assembly slide on which it can roll and more generally, to any object or article of manufacture to which the ball bearing can be attached.

Still referring to FIGS. 6–7, bearing stud 75 includes bearing hub lip 65 and a side distal from the bearing hub lip to lock on flush inner bearing race 51 via counterbore 67. Extended inner bearing race 52, as shown, includes chamfer 62. Bearing stud mount 75 can be staked (also called "swaged") along chamfer 62 so as to secure, in conjunction with hub lip 65, the ball bearing roller components, and in particular inner races 51–52, together to form fully assembled, connected ball bearing roller 22. More specifically, distal side 47 is contoured or shaped to include sides 47a and 47b. As shown, side 47a is swaged such that a portion 63 of the bearing stud, also called a swaged portion 63, is in compressive contact with the chamfer 62. Once secured together, ball bearing roller 22 is ready for use (i.e, rolling contact along a defined path, for example, the path created by surface 13*b* of segment 12*c* of slide member 12—all of which is shown in phantom lines).

Typically, in a split inner race unground bearing, a staked (also called "swaged") shoulder, rather than a bearing hub lip (also called a "shoulder lock") is used to secure ball bearing roller components together. However, the amount of material that can be staked, again, for example, swaged portion 63 of bearing mount 75, is small in thickness relative to the thickness of bearing hub lip 65. This, in addition to manufacturing inconsistencies associated with the staking process, previous bearing rollers have been susceptible to improper fitting and securing of bearing roller components and premature bearing roller failure.

Referring to FIG. 6, roller 22 can be attached to an article of manufacture, for example, ball bearing slide assembly 10 (shown in phantom) which itself can be connected to a structure, for example, structure 200 (shown in FIG. 11). In particular, the connection between carriage 16 and roller 22 can be accomplished by sizing bearing stud 75 so that it can pass through carriage 16 as shown. The roller can then be attached by staking a portion of material, illustrated by curved lines 28*b*, of bearing stud 75 to carriage 16. This staking action results in the bearing roller being fixedly held to the carriage, or more generally, to any other structure to which the bearing might be attached. Staking the bearing roller to the carriage anchors the roller to its place on the carriage.

The inventive bearing roller provides for a bearing that can be staked, via material 28*b*, to a carriage 16 or other structure. With the roller adjacent the carriage, swage material portion 63 preferably abuts the carriage or other structure (which is shown in phantom). In this way, a significant feature of the inventive roller design is that it can provide for the protection of the swaged portion 63. In particular, the swaged portion is protected against shock loads, overloads and thrust loads that can otherwise cause the roller to disassemble into its component parts.

The inventive bearing roller, and in particular its components (e.g., outer bearing race 54, inner bearing races 51–52, and the bearing stud can be made from a variety of materials. Typically, the preferred material for the bearing races is carbon or stainless steel, however, polymers can also be incorporated if desired for noise reduction. Carbon steel components are commonly plated and available in any finish that may be required. Depending on the end application (e.g., a slide assembly for a box structure), the material can be heat-treated for added durability and strength. The ball bearing components can be machined, coined, and metal pressed. Such manufacturing processes are well-known and are included by way of example only.

Those skilled in the art shall understand that the ball bearing roller can be used in a variety of applications, not all of which are described here, and that the description with respect to the ball bearing slide assembly and box structure (shown in FIGS. 9 and 10) is by way of illustration and example only, and not for purposes of limiting potential applications for the ball bearing roller.

Those of skill in the art will understand that the bearing type for use in the slide assembly can vary, depending on the project at hand. For example, suitable bearings can include ball bearings (at least one embodiment of which is described in detail herein), roller bearings, and plane bearings. Where the bearing comprises a rolling element, the rolling element can be, for example, a bearing ball or bearing roller. Bushings could also be used in place of bearings in the inventive slide assembly.

Various fasteners (other than a bearing stud) can be used to secure or attach the bearing to a structure (for example, a slide assembly, or a box), depending on the type of bearing that is used. Suitable fasteners can include threaded studs, rivets, retaining ring grooves, and welded studs.

Referring to FIG. 8 a ball bearing system 90 is shown comprising two ball bearing assemblies 10 that are in accordance with the present invention. The ball bearing assemblies are connected in a conventional manner, for example, using cross braces 80, 81 as shown, to assemble the system. As shown, assemblies 10 include mounting tabs 26*a*–*c* for mounting the assemblies to a structure, such as structure 200 (shown in FIGS. 11–12). The spacing and positioning of the tabs can vary to convenience depending on the application at hand. Carriage 16 couples, in combination with the ball bearing rollers (shown in FIG. 2), the first slide member 12 to the second slide member 14 such that the second member moves relative to both the first slide member and the carriage.

Figure 9:
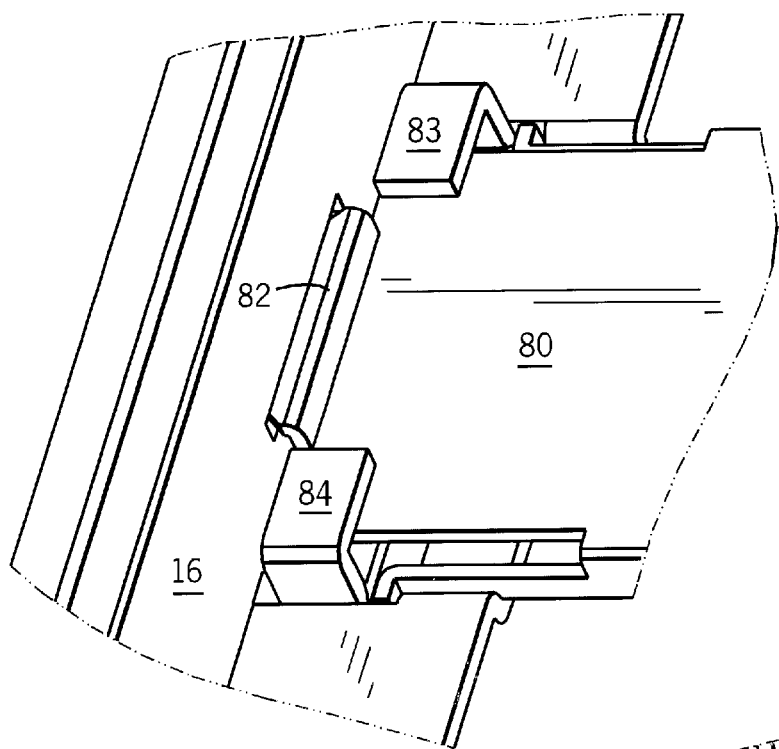
FIG. 9 enlarged partial cross-sectional view taken along line 9—9 of FIG. 8.
Figure 10:
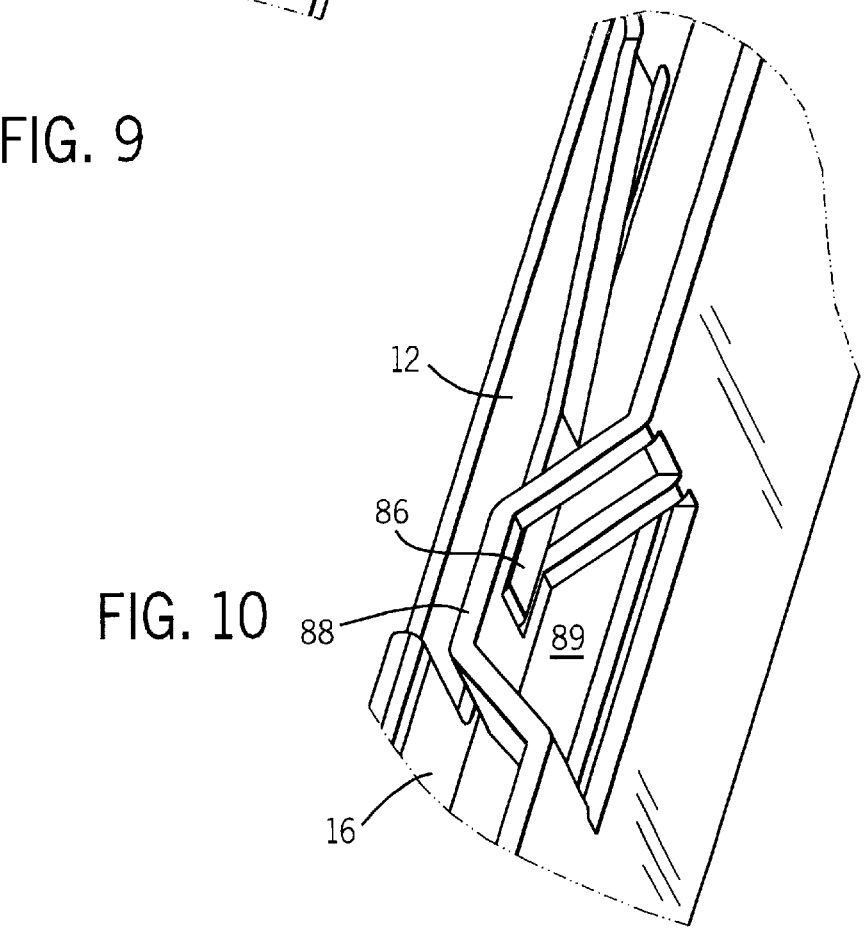
FIG. 10 enlarged partial cross-sectional view taken along line 10—10 of FIG. 8.

FIG. 9 illustrates an enlarged view taken along line 9—9 of FIG. 8 and illustrates one way in which a plurality of ball bearing slide assemblies can be interconnected or otherwise attached using cross brace 80. As shown cross brace 80 connects to carriage 16 via tab 82 and is stabilized using stops 83 and 84. Cross brace 80 is kept in position by stops 83, 84, and tab 82. Brace 80 can be selected to have a width that can vary to convenience. Referring to FIG. 10 an enlarged view of the area defined by line 10—10 of FIG. 8 is shown. Second slide member 12 includes push tab 86 which can engage an extension 88 having an open area 89, thereby stopping second slide member 12 from disengaging from carriage 16.

Referring to FIGS. 11 and 12, one application, a toolbox 200, is shown incorporating the ball bearing slide assembly of the present invention. The toolbox is essentially a specialized cabinet or case comprising, or capable of comprising, a fill complement of drawers that can be box like structures. As shown, the toolbox 200 includes drawer 201, shown in closed (FIG. 11) and open (FIG. 12) positions. One drawer is shown—the rest are removed for the convenience of the reader. Although a toolbox is shown and preferred, those skilled in the art shall also recognize that other applications incorporating the present invention are possible and contemplated. Examples of suitable applications for the bearing slide mechanism described herein include: toolboxes, storage cabinets (e.g., file storage cabinets), platforms, baking and bakery shelves, medical cabinets, and food storage applications, among others. Examples of suitable uses for the ball bearing described herein include: toolboxes, casters, storage cabinets (e.g., file storage cabinets), trolleys, overhead conveyor systems, swivel/glider rockers, sliding doors/mobile partitions, miscellaneous tool applications, mobile electrification/ festoon systems, roller conveyors, storage cabinets, overhead crane systems, idler pulleys platforms, baking and bakery shelves, medical cabinets, and food storage applications, among others.

Toolbox 200 comprises a housing 202 defining an interior 204 therein. The housing, as shown, includes a base 205, left and right side walls 206, 208, respectively, and back wall 210. The left and right side walls can more precisely be referred to as "false walls" in that they are designed primarily to receive, via holes 212, slide assemblies 10. In the embodiment shown, holes 212 are arranged in three, substantially vertical and parallel rows. This pattern can vary to convenience as well as the overall quantity of holes so as to accommodate, for example, drawers of varying sizes.

Indeed, the drawers can be of varying sizes, with the accompanying ball bearing slide assemblies and all components thereof (e.g., first element, second element, etc.) sized appropriately. The present invention also contemplates those applications where drawers are replaced by flat or curved structures of varying dimensions in place of standard box-like drawers. The toolbox can comprise a front wall or surface (not shown). It is understood that false walls 206, 208 can be covered with finished walls (not shown).

In conclusion, although the invention has been described in considerable detail through the preceding specification and drawings, this detail is for the purpose of illustration only. Many variations and modifications, including the addition, subtraction and placement of various components of the invention, can be made by one skilled in the art without departing from the spirit and scope of the invention as described in following claims.

What is claimed is:

1. A ball bearing slide assembly, the slide assembly comprising:
   a first slide member;
   a second slide member;
   a carriage disposed between the first and second slide members; and
   a ball bearing roller, the ball bearing roller further comprising:
      an outer bearing race;
      a bearing stud to mount the ball bearing roller to the carriage, the bearing stud including a bearing hub lip and a side distal from the bearing hub lip;
      an inner being race adjacent the bearing stud, the inner bearing race including a chamber; and
      a bearing ball disposed in an area between the inner and outer races; wherein the distal from the bearing hub lip is swaged such that a swaged portion of the bearing stud is in compressive contact with the chamfer and the portion abuts the carriage;
   wherein the carriage couples, in combination with the ball bearing roller, the first slide member to the second slide member such that the second member moves relative to both the first slide member and the carriage;
   wherein the inner bearing race is a split inner bearing race; and
   wherein the split inner bearing race comprises an extended inner bearing race adjacent the bearing stud, the extended inner bearing race including a chamfer and a side adjacent the chamfer that extends beyond a first side of the outer bearing race and a flush inner bearing race adjacent to and flush with the bearing stud.

2. The ball bearing slide assembly of claim 1 wherein the ball bearing roller is a caged ball bearing roller.

3. The ball bearing slide assembly of claim 1, wherein the second slide member comprises a substantially vertical segment, an upper bent segment, and a lower bent segment, such that the upper and lower bent segments extend from, and are connected to, the vertical segment.

4. The ball bearing slide assembly of claim 3, wherein at least one of the second slide member bent segments comprises a V-shaped slide surfaces to reduce frictional contact between the ball bearing roller and the slide surface.

5. A ball bearing roller in combination with a ball bearing slide assembly, the ball bearing roller and ball bearing slide assembly combination comprising:
   an outer bearing race;
   a bearing stud comprising a bearing hub lip and a side distal from the bearing hub lip;
   an extended inner bearing race adjacent the bearing stud, the extended inner bearing race including a chamfer and a side adjacent the chamfer that extends beyond a first side of the outer bearing race;
   a flush inner bearing race adjacent to and flush with the bearing stud; and a bearing ball disposed in an area between the inner and outer races;
   wherein the side distal from the bearing hub lip is staked such that a portion of the bearing stud is in compressive contact with the chamfer;
   wherein the side distal from the bearing hub lip is swaged such that a portion of the bearing stud is in compressive contact with the chamfer;
   wherein the ball bearing slide assembly comprises a first slide member, a second slide member, a carriage disposed between the first and the second slide members, and wherein the carriage couples, in combination with the ball bearing roller, the first slide member to the second slide member such that the second slide member moves relative to both the first slide member and the carriage; and
   wherein the portion of the bearing stud in compressive contact with the chamfer abuts the carriage.

6. The ball bearing roller and slide assembly combination of claim 5 wherein the second slide member comprises a substantially vertical segment, an upper bent segment, and a lower bent segment, such that the upper and lower bent segments extend from, and are connected to, the vertical segment, and wherein at least one of the second slide member bent segments comprises a V-shaped slide surface to align the ball bearing roller to the slide surface.

7. The combination of claim 5 wherein the second slide member comprises a substantially vertical segment, an upper bent segment, and a lower bent segment, such that the upper and lower bent segments extend from, and are connected to, the vertical segment.

8. The combination of claim 7 wherein at least one of the second slide member bent segments comprises a V-shaped slide surface to align the ball bearing roller to the slide surface.

9. A ball bearing roller in combination with a ball bearing slide assembly, the roller and slide assembly combination comprising:
   an outer bearing race;
   a bearing stud comprising a bearing hub lip and a side distal from the bearing hub lip;
   an inner bearing race adjacent the bearing stud, the inner bearing race including a chamfer; and
   a ball bearing disposed in an area between the inner and outer races;
   wherein the side distal from the bearing hub lip is swaged such that a portion of the bearing stud is in compressive contact with the chamfer;
   wherein the ball bearing slide assembly comprises a first slide member, a second slide member, a carriage disposed between the first and the second slide members, and wherein the carriage couples, in combination with the ball bearing roller, the first slide member to the second slide member such that the second slide member moves relative to both the first slide member and the carriage; and
   wherein the portion of the bearing stud in compressive contact with the chamfer abuts the carriage.

10. The combination of claim 9 further comprising a split inner race.

* * * * *